United States Patent
Braunisch et al.

(10) Patent No.: US 6,593,793 B1
(45) Date of Patent: Jul. 15, 2003

(54) ELECTRONIC PACKAGE WITH INTEGRATED CLOCK DISTRIBUTION STRUCTURE

(75) Inventors: Henning Braunisch, Chandler, AZ (US); Raj Nair, Gilbert, AZ (US); Gilroy Vandentop, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 24 days.

(21) Appl. No.: 10/042,273

(22) Filed: Jan. 11, 2002

(51) Int. Cl.[7] ................................................ H03K 3/00
(52) U.S. Cl. ........................ 327/291; 327/141; 327/295
(58) Field of Search .......................... 327/99, 141, 291, 327/292, 293, 295, 565; 333/113, 117, 123, 157, 160, 161

(56) References Cited

U.S. PATENT DOCUMENTS

| | | | |
|---|---|---|---|
| 5,387,885 A | | 2/1995 | Chi .............................. 333/100 |
| 5,397,943 A | * | 3/1995 | West et al. .................... 326/39 |
| 5,640,112 A | | 6/1997 | Goto et al. ................... 327/141 |
| 6,008,682 A | * | 12/1999 | Mirov .......................... 327/333 |
| 6,037,822 A | * | 3/2000 | Rao et al. ..................... 327/298 |
| 6,351,576 B1 | * | 2/2002 | Ding ............................ 385/14 |
| 6,400,230 B2 | * | 6/2002 | Fairbanks ..................... 331/57 |

OTHER PUBLICATIONS

Ryu et al., "RF Interconnect for Multi–Gbit/s Board–Level Clock Distribution," IEEE Transactions on Advanced Packaging, vol. 23, No. 3, Aug. 2000, pp. 398–407.

Vernon L. Chi, "Salphasic Distribution of Clock Signals for Synchronous Systems," IEEE Transactions on Computers, vol. 43, No. 5, May 1994, pp. 597–602.

Lei et al., "Wave Model Solution to the Ground/Power Plane Noise Problem," IEEE Transactions on Instrumentation and Measurement, vol. 44, No. 2, Apr. 1995, pp. 300–303.

Lei et al., "High–Frequency Characterization of Power/Ground–Plane Structures," IEEE Transactions on Microwave Theory and Techniques, vol. 47, No. 5, May 1999, pp. 562–569.

Emery et al., "Novel Microelectronic Packaging Method for Reduced Thermomechanical Stresses on Low Dielectric Constant Materials," in Proc. Adv. Metallization Conf. (AMC), Montreal, Oct. 9–11, 2001.

Towle et al., "Bumpless Build–Up Layer Packaging," in Proc. ASME Int. Mech. Eng. Congress and Exposition (IMECE), New York, Nov. 11–16, 2001.

* cited by examiner

*Primary Examiner*—My-Trang Nu Ton
(74) *Attorney, Agent, or Firm*—Pillsbury Winthrop LLP

(57) ABSTRACT

An electronic package and method for spatially distributing a clock signal is presented. The electronic package includes a low-loss structure, a semiconductor die, clocking vias, and clock receivers on the die. The low-loss structure is constructed and arranged to be driven by a clock signal and to produce standing waves. The clocking vias are constructed and arranged to connect the low-loss structure to the die and to conduct the standing waves to the die. The clock receivers generate respective synchronous on-chip clock signals based at least in part on the conducted standing waves.

30 Claims, 5 Drawing Sheets

100

ELECTRONIC PACKAGE WITH INTEGRATED CLOCK DISTRIBUTION STRUCTURE

BACKGROUND

1. Field

This invention relates generally to clock signal distribution. More specifically, this invention relates to a system and method for spatial clock signal distribution using an electronic package.

2. General Background and Related Art

In microelectronic chips such as microprocessors, the operations of multiple chip components must be synchronized. Yet, the physical separation of such components may cause significant propagation delay-induced phase shifts. In recent years, the operating frequency, or clock frequency, of microprocessors has steadily risen. Because of such increases in clock frequency, as well as increased system function, problems relating to high-frequency effects and power consumption have become more pronounced. As such, clock distribution techniques have been proposed to minimize these effects.

A number of clock distribution techniques have involved propagating clock signals in order to synchronize the signals at receiving points. For example, clock signals are generated on-chip using microchip transmission lines 10 arranged on a microelectronic chip in a so-called H-tree, as shown in FIG. 1 (Prior Art). The purpose of the H-tree structure is to minimize skew due to different path lengths from a clock generator 20 to the various receiving elements. Propagation loss and repeated branching at T-junctions 30 generally require the introduction to a microelectronic chip of clock buffers 40 that receive and retransmit a clock signal along a path from the clock generator 20 to any particular clock receiver 50. In some systems that include H-tree structures, a clock signal could traverse, for example, as many as ten stages of clock buffers before reaching its final destination. Because of the large number of such elements, skew, jitter, and excessive power consumption result.

Standing-wave behavior is characterized by discontinuous progression or abrupt jumps in the advancement of phase with distance. This behavior is a fundamental property of standing waves in any physical situation governed by the wave equation and where the signal is isophasic, that is, its phase remains constant over extended regions and abruptly jumps by 180° between adjacent regions. A clock distribution technique has attempted to exploit the spatial phase characteristics of a standing wave to minimize clock skew. In particular, standing waves are generated on a semiconductor die and extended to clock receivers at various entities to be synchronized. However, amplifiers and phase advancing units must be employed along transmission paths to minimize losses.

Therefore, what is needed is an improved system and method for distributing a clock signal.

DETAILED DESCRIPTION

An electronic package and method for spatial clock distribution, as presented herein, includes a low-loss structure, a semiconductor die, clocking vias, and clock receivers on the die. The low-loss structure is constructed and arranged to be driven by a clock signal and to produce standing waves. The clocking vias are constructed and arranged to connect the low-loss structure to the die and to conduct the standing waves to the die. The clock receivers generate respective synchronous on-chip clock signals based at least in part on the conducted standing waves.

Figure 1:
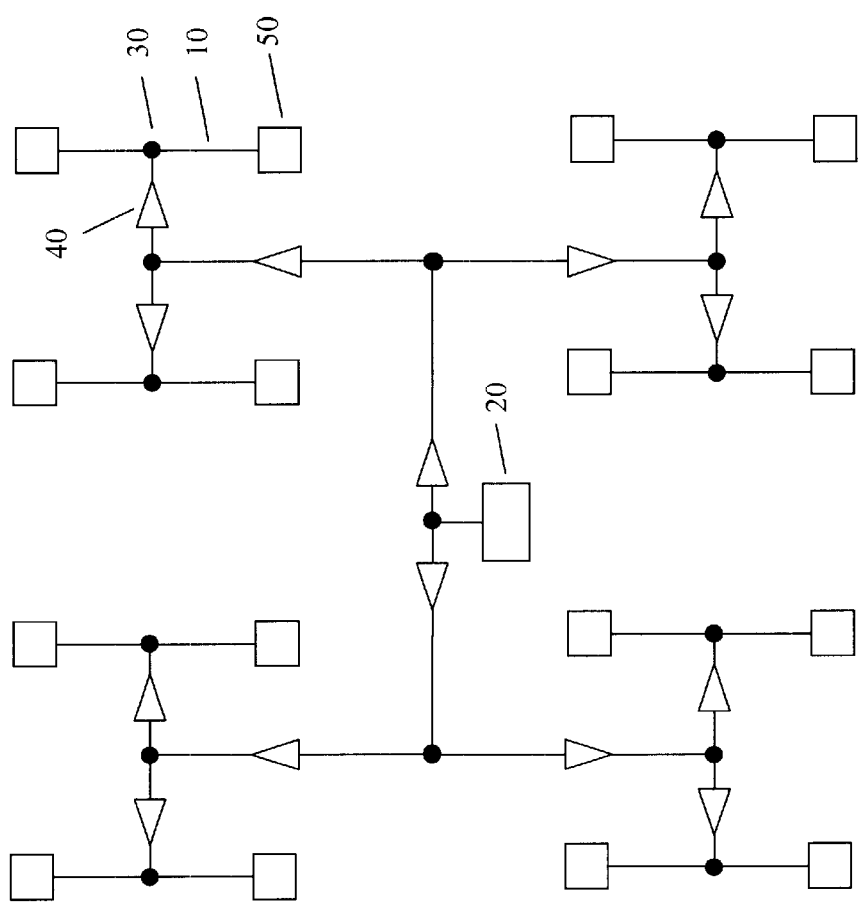
FIG. 1 (Prior Art) illustrates an H-tree structure on a microelectronic chip.
Figure 2A:
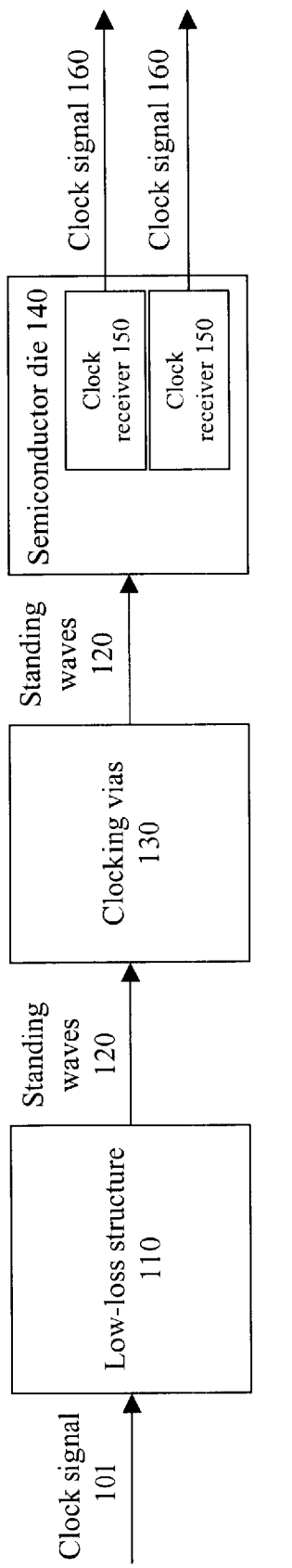
FIG. 2A is a high-level block diagram of a clock signal distribution system according to an embodiment of the present invention.

FIG. 2A is a high-level block diagram of a clock signal distribution system 100 using standing waves according to an embodiment of the present invention. System 100 includes a low-loss structure 110, clocking vias 130, and a semiconductor die 140 in an electronic package. Low-loss structure 110 receives a clock signal 101 and generates standing waves 120. Clocking vias 130 conduct standing waves 120 to die 140. Clock receivers 150 on die 140 generate respective synchronous on-chip clock signals 160 based in part on the conducted standing waves 120.

Figure 2B:
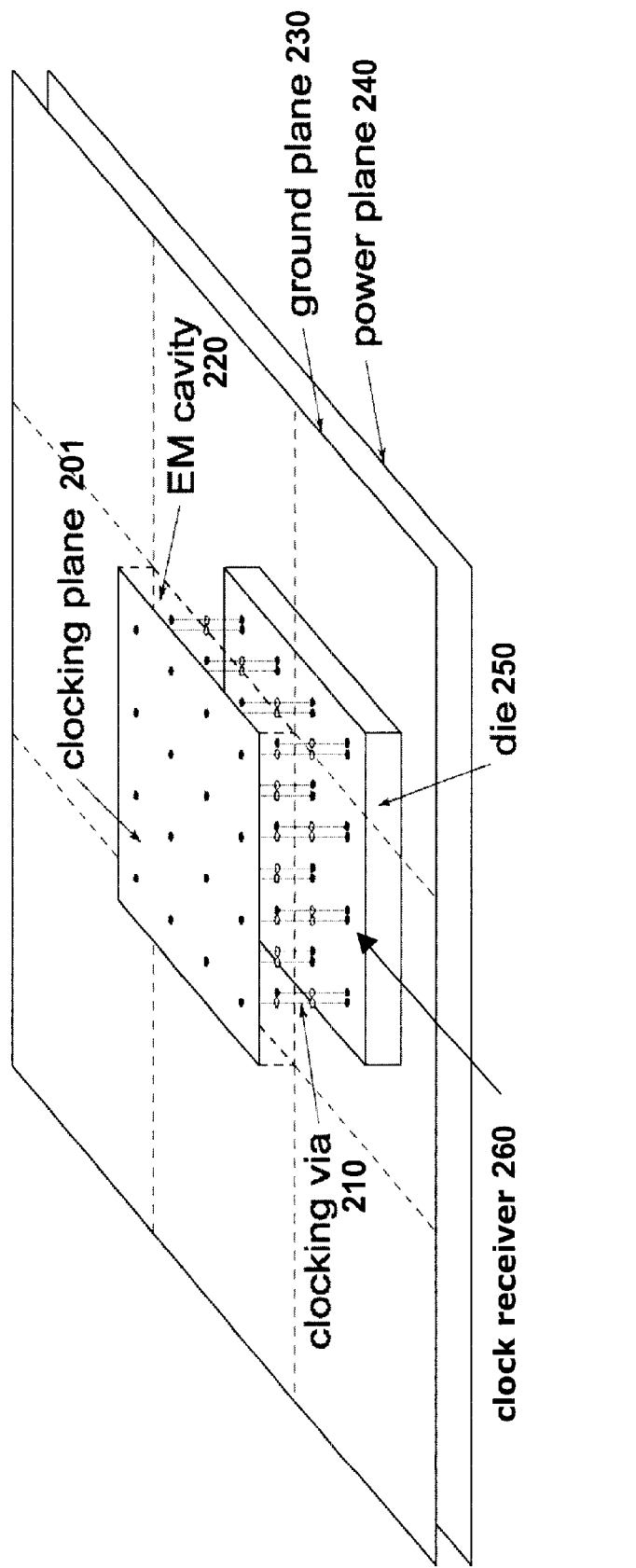
FIG. 2B illustrates a clock signal distribution system according to an embodiment of the present invention.

FIG. 2B illustrates a system 200 according to an embodiment of the present invention. System 200 comprises portions of an electronic package. Specifically, system 200 includes a clocking plane 201, clocking vias 210, a semiconductor die 250, clock receivers 260, a ground plane 230, and a power plane 240.

In an exemplary implementation, a grid of wide transmission lines or a substantially solid metal patch is integrated into the electronic package to form a low-loss structure. The low-loss structure may comprise clocking plane 201 and ground plane 230, which form an electromagnetic (EM) cavity 220 therebetween. Specifically, a vertical electric field and a horizontal magnetic field are created between clocking plane 201 and ground plane 230. The voltage potential at points along clocking plane 201 exhibits the same distribution as the electric field.

Elements of the low-loss structure, such as wide transmission lines, substantially solid metal patches, clocking plane 201, and ground plane 230, may be formed using a high-density integration (HDI) patterning technology that is analogous to patterning technologies often used for advanced organic packages, such as flip chip pin grid array (FCPGA) packages, and printed circuit boards. In particular, the same patterning technology may be used for making the low-loss structure and other parts of the electronic package.

In order to enhance the low-loss property of the low-loss structure, one or more dielectric materials with low loss, or a small loss tangent, may be incorporated into the low-loss structure. For example, EM cavity 220 may be filled with a low-loss dielectric material, such as air or another non-solid. Advanced manufacturing technologies, such as micromachining and techniques typically employed in building microelectromechanical systems (MEMS), may be applied to incorporate dielectric materials into the low-loss structure.

The projection of the low-loss structure may extend over the entire active area of die 250. The low-loss structure may be driven at an arbitrary location with a signal, such as a multi-GHz signal, in order to excite standing waves that are in phase everywhere up to phase shifts of 180°. The standing waves may be conducted to various locations on die 250 through clocking vias 210.

The low-loss structure may be driven at arbitrary locations. It is to be noted that simultaneous driving with more than one independent source may lead to a net power flow through the low-loss structure associated with a power exchange between the sources, leading to a degradation of the desired isophasic property of the standing-wave pattern. The drivers and clock signal generators may be located on-die or off-die, and either within the package or without. The drivers and clock signal generators may be connected to the low-loss structure using clocking vias 210 or other suitable connections.

Clocking vias 210 connect to clocking plane 201 and ground plane 230 and lead down to die 250. In various embodiments, clocking vias 210 are capable of supporting standing waves.

Die 250 may include clock receivers 260 with essentially capacitive input impedance. Clock receivers 260 are connected to clocking vias 210 and generate respective desired synchronous on-die clock signals. Since standing waves are in phase everywhere up to a phase shift of 180°, clock receivers 260 can generate respective clock signals with little skew relative to each other. Therefore, a high degree of synchronization can be achieved across the entire die 250. Jitter and power consumption are minimized as well. Exemplary clock receivers include field-effect transistors (FETs).

Figure 3B:
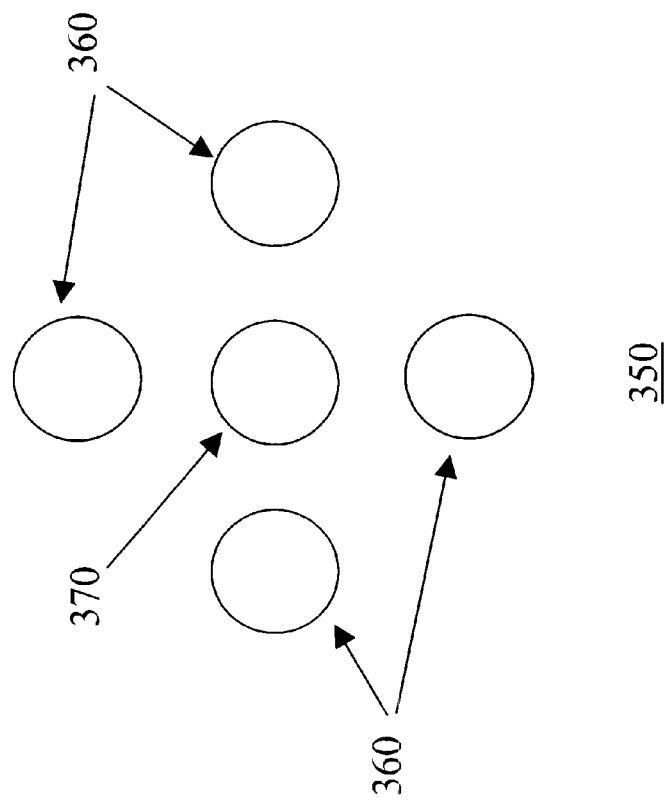
FIGS. 3A and 3B illustrate top, cross-sectional views of exemplary clocking vias according to embodiments of the present invention.
Figure 3A:
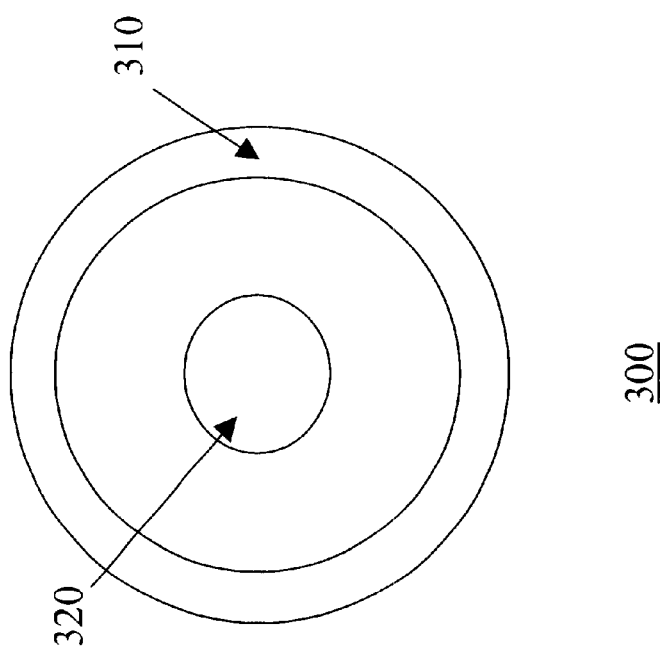

FIGS. 3A and 3B illustrate top, cross-sectional views of exemplary embodiments of clocking vias 210 in FIG. 2B. In embodiment 300 of FIG. 3A, area 310 denotes connections to ground plane 230 and area 320 denotes connections to clocking plane 201. Embodiment 300 effectively creates a coaxial waveguide, which may be suitable for coupling to an EM cavity and supporting standing waves. In embodiment 350 of FIG. 3B, areas 360 denote connections to ground plane 230 and area 370 denotes connections to clocking plane 201. Embodiment 350 uses identical microvias. It is to be noted that the open nature of embodiment 350 may result in electromagnetic disadvantages, such as energy loss related to radiation of energy into an electronic package.

Clocking vias 210 in FIG. 2B may be connected to clock receivers 260 on die 250 via various connection means. For instance, controlled collapsed chip connection (C4) technology may be employed. In other embodiments, bumpless build-up layer (BBUL) connection mechanisms may be employed to reduce parasitics associated with interfacing. BBUL mechanisms allow packaging components, such as vias, to connect directly to a die, realizing a seamless interface between clocking vias 210 and clock receivers 260 on die 250.

More specifically, in a BBUL implementation, at least one die is embedded in a substrate, such as bismaleimide triazine (BT) laminate or a copper heat spreader, which then has one or more build-up layers formed on top. A standard microvia formation process, such as laser drilling, can be used to establish the connections between the build-up layers and the die bond pads. The die may be embedded in the substrate panel with molding or dispensed encapsulation material. The build-up layers are made with a HDI patterning technology that is analogous to patterning technologies often used for advanced organic packages, such as FCPGA packages, and printed circuit boards.

Figure 4:
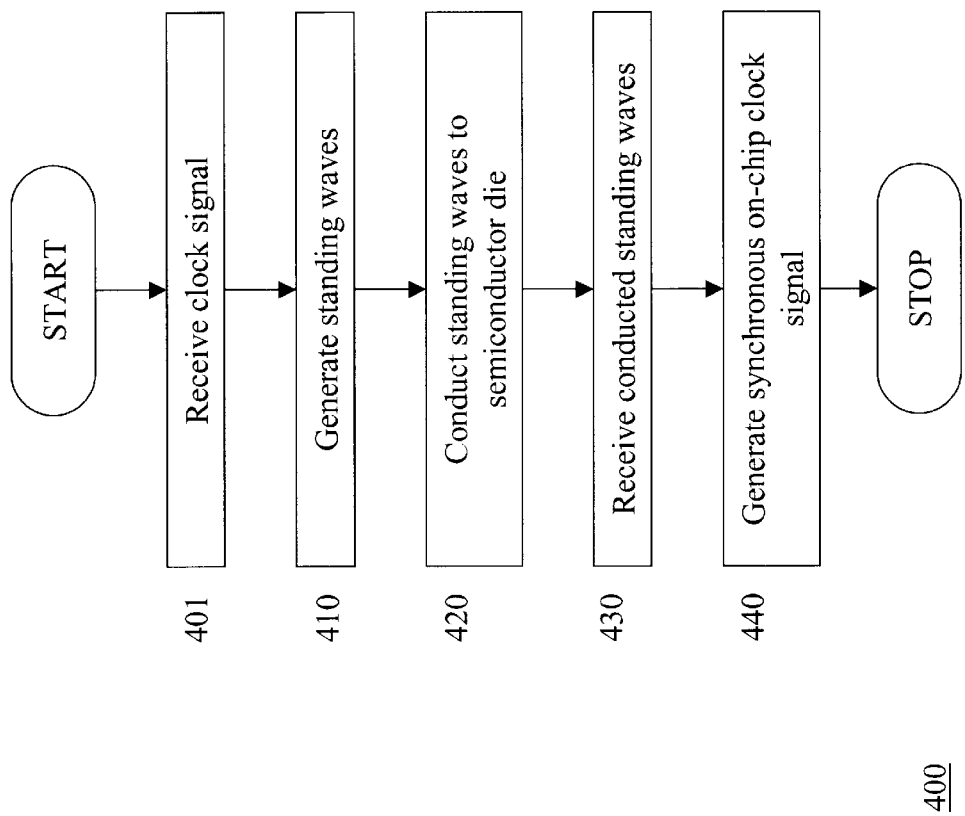
FIG. 4 is a high-level flow diagram of a process for spatially distributing a clock signal according to an embodiment of the present invention.

FIG. 4 is a high-level flow diagram of a process 400 for spatial clock distribution according to an embodiment of the present invention. In task 401, a low-loss structure that is integrated into an electronic package receives a clock signal. In task 410, the low-loss structure generates standing waves. In task 420, the standing waves are conducted by clocking vias to a semiconductor die. In task 430, clock receivers in the die receive the conducted standing waves. In task 440, each clock receiver generates a synchronous on-chip clock signal based at least in part on the conducted standing waves.

The foregoing description of the preferred embodiments is provided to enable any person skilled in the art to make or use the present invention. Various modifications to these embodiments are possible, and the generic principles presented herein may be applied to other embodiments as well. As such, the present invention is not intended to be limited to the embodiments shown above but rather is to be accorded the widest scope consistent with the principles and novel features disclosed in any fashion herein.

What is claimed is:

1. An electronic package for spatially distributing a clock signal, comprising:

a low-loss portion constructed and arranged to be driven by the clock signal and to produce standing waves;

a semiconductor die;

a plurality of clocking vias constructed and arranged to connect the low-loss portion to the die and to conduct the standing waves to the die; and a plurality of clock receivers on the die to generate a respective plurality of synchronous on-chip clock signals based at least in part on the conducted standing waves.

2. The electronic package of claim 1, wherein the die is constructed and arranged such that standing waves are conducted over an entire active area of the die.

3. The electronic package of claim 1, wherein the low-loss portion includes a grid of transmission lines.

4. The electronic package of claim 1, wherein the low-loss portion includes a substantially solid metal patch.

5. The electronic package of claim 1, wherein the low-loss portion comprises a clocking plane and a ground plane forming an electromagnetic cavity, the plurality of clocking vias being connected to at least one of the clocking plane and the ground plane.

6. The electronic package of claim 1, wherein at least a portion of the low-loss portion is substantially filled with a dielectric material.

7. The electronic package of claim 6, wherein the dielectric material is a nonsolid material.

8. The electronic package of claim 1, wherein at least a portion of the low-loss portion is constructed and arranged using a high-density integration (HDI) patterning process.

9. The electronic package of claim 1, wherein at least one among the plurality of clocking vias comprises a coaxial waveguide.

10. The electronic package of claim 1, wherein at least one among the plurality of clocking vias comprises a microvia.

11. The electronic package of claim 1, wherein the driving clock signal has a frequency greater than 1 GHz.

12. The electronic package of claim 1, wherein at least one clock receiver is connnected to at least one clocking via with a controlled collapsed chip connection (C4) mechanism.

13. The electronic package of claim 1, wherein at least one clock receiver is connected to at least one clocking via with a bumpless build-up layer (BBUL) mechanism.

14. The electronic package of claim 1, wherein a driver or generator associated with the driving clock signal is located external to the die.

15. The electronic package of claim 1, wherein a driver or generator associated with the driving clock signal is located external to the package.

16. The electronic package of claim 1, wherein a driver or generator associated with the driving clock signal is connected to the low-loss portion with at least one clocking via.

17. A method for spatially distributing a clock signal using an electronic package, comprising:
   providing an electronic package, the package comprising a low-loss portion constructed and arranged to be driven by a clock signal, a semiconductor die, a plurality of clocking vias constructed and arranged to connect the low-loss portion to the die, and a plurality of clock receivers on the die;
   receiving, by the low-loss portion, the clock signal;
   generating, by the low-loss portion, standing waves;
   conducting, by the clocking vias, the generated standing waves to the die;
   receiving, by the clock receivers, the conducted standing waves; and
   generating, by each clock receiver, a respective synchronous on-chip clock signal based at least in part on the conducted and received standing waves.

18. The method of claim 17, wherein the standing waves are conducted over an entire active area of the die.

19. The method of claim 17, wherein the low-loss portion includes a grid of transmission lines.

20. The method of claim 17, wherein the low-loss portion includes a substantially solid metal patch.

21. The method of claim 17, wherein the low-loss portion comprises a clocking plane and a ground plane forming an electromagnetic cavity, the plurality of clocking vias being connected to at least one of the clocking plane and the ground plane.

22. The method of claim 17, wherein at least a portion of the low-loss portion is substantially filled with a dielectric material.

23. The method of claim 22, wherein the dielectric material is a non-solid material.

24. The method of claim 17, wherein at least a portion of the low-loss portion is constructed and arranged using a high-density integration (HDI) patterning process.

25. The method of claim 17, wherein at least one among the plurality of clocking vias comprises a coaxial waveguide.

26. The method of claim 17, wherein at least one among the plurality of clocking vias comprises a microvia.

27. The method of claim 17, wherein the driving clock signal has a frequency greater than 1 GHz.

28. The method of claim 17, wherein at least one clock receiver is connected to at least one clocking via with a controlled collapsed chip connection (C4) mechanism.

29. The method of claim 17, wherein at least one clock receiver is connected to at least one clocking via with a bumpless build-up layer (BBUL) mechanism.

30. The method of claim 17, wherein a driver or generator associated with the driving clock signal is located external to the die.

* * * * *